United States Patent [19]
Castellon

[11] Patent Number: 5,813,794
[45] Date of Patent: Sep. 29, 1998

[54] TELESCOPIC SHAFTS

[76] Inventor: Melchor Daumal Castellon, Diputacion, 455, Barcelona, Spain, 08013

[21] Appl. No.: 839,792

[22] Filed: Apr. 18, 1997

[30] Foreign Application Priority Data

Apr. 18, 1996 [ES] Spain ...................................... 9600871

[51] Int. Cl.$^6$ ...................................................... B62D 1/18
[52] U.S. Cl. ...................................... 403/359; 403/DIG. 3; 280/777; 188/371; 464/162; 74/492
[58] Field of Search ..................................... 403/359, 375, 403/DIG. 3, 376, 380, 404, 383; 74/492; 280/777; 188/371; 464/183, 172, 162

[56] References Cited

U.S. PATENT DOCUMENTS

| | | | |
|---|---|---|---|
| 3,703,105 | 11/1972 | Milton et al. | 74/492 |
| 3,788,148 | 1/1974 | Connell et al. | 74/492 |
| 3,811,337 | 5/1974 | Allison | 74/492 |
| 4,006,647 | 2/1977 | Oonuma et al. | 74/492 |
| 4,098,141 | 7/1978 | Yamaguchi | 74/492 |
| 4,125,000 | 11/1978 | Grob | 403/359 X |
| 4,572,022 | 2/1986 | Mettler | 74/492 |
| 4,738,154 | 4/1988 | Hancock | 74/492 |
| 4,867,003 | 9/1989 | Beauch et al. | 74/492 |
| 4,991,871 | 2/1991 | Sadakata | 74/492 X |
| 5,228,720 | 7/1993 | Sato et al. | 403/359 X |
| 5,235,734 | 8/1993 | DuRocher er al. | 74/492 X |
| 5,314,204 | 5/1994 | DuRocher et al. | 280/777 |
| 5,464,251 | 11/1995 | Castellon | 74/492 X |
| 5,640,884 | 6/1997 | Fujiu et al. | 74/492 |

FOREIGN PATENT DOCUMENTS

| | | | |
|---|---|---|---|
| 0 124 995 | 11/1984 | European Pat. Off. . | |
| 612649 | 8/1994 | European Pat. Off. | 74/492 |
| 56-75264 | 6/1981 | Japan | 74/492 |
| 9202654 | 12/1992 | Spain . | |
| 9300654 | 3/1993 | Spain . | |
| 9500177 | 1/1995 | Spain . | |
| 1 369 188 | 10/1974 | United Kingdom . | |
| 2 269 140 | 2/1994 | United Kingdom . | |
| 2 273 969 | 7/1994 | United Kingdom . | |

*Primary Examiner*—Harry C. Kim
*Attorney, Agent, or Firm*—Jacobson, Price, Holman & Stern, PLLC

[57] ABSTRACT

Telescopic shafts having a peripheral zone of a male member having grooves and ribs which grooves and ribs are interrupted longitudinally according to a sliding zone, which zone, in one embodiment, terminates in proximity to a fork member of a U-joint and in another embodiment, terminates at a limit of one of the extremes of the fork member.

4 Claims, 2 Drawing Sheets

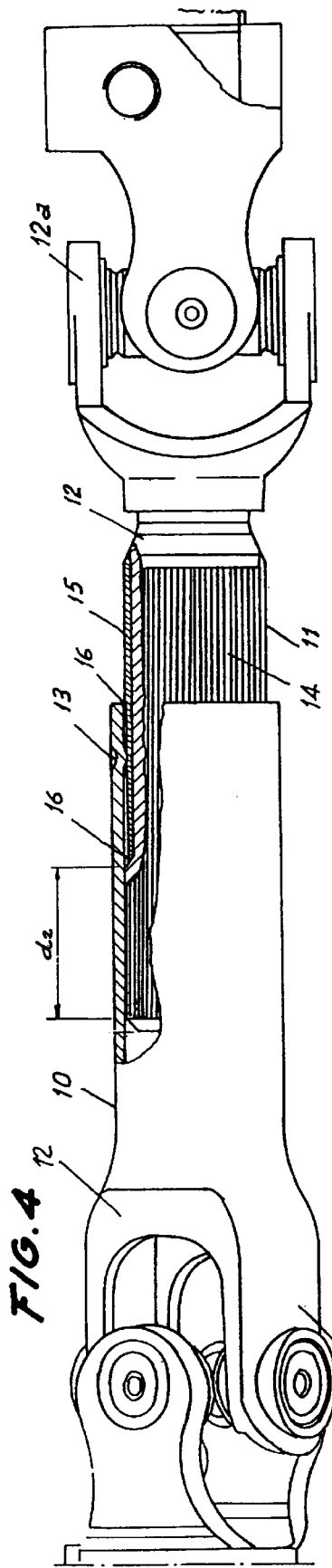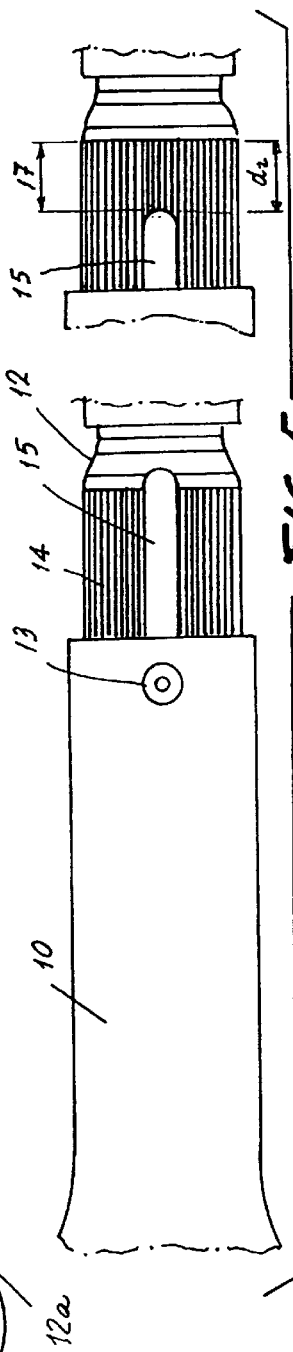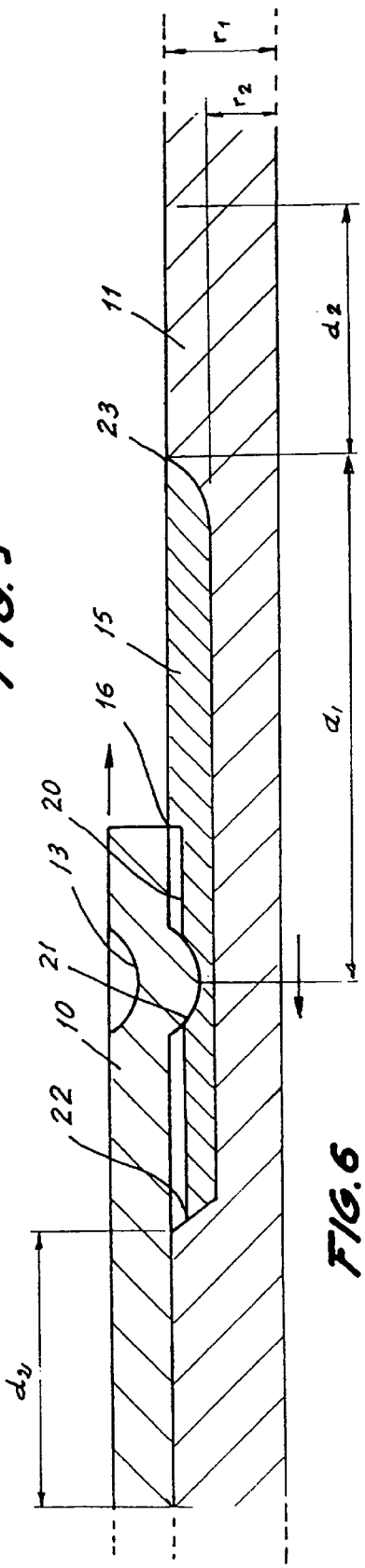

TELESCOPIC SHAFTS

FIELD OF THE INVENTION

As mentioned in its title, the present patent application relates to "Improvements to telescopic shafts" of which the novel characteristics of construction, shaping and design achieve the object for which they have been specifically intended with maximum security and efficiency.

BACKGROUND OF THE INVENTION

The patent P9202654 belonging to the same proprietor discloses a telescopic shaft particularly intended for the constitution of car steering columns and formed by two tubular members which are rotationally engaged by the meshing of respective longitudinally knurled regions, one of which members has at least one projection directed toward the other member which abuts against the longitudinal ribs of the knurling provided therein allowing the axial displacement of one member with respect to the other by the continuous deformation of at least some of these ribs.

At a later stage and according to the additional patent P9300654, advantages over the main patent were found, involving the provision of a shaft formed by three tubular telescopic members of circular section provided on their contacting surfaces with a succession of mutually meshing longitudinal knurling or serrations, a certain frictional force having been provided between one of the extreme members and the intermediate member and a collapsing system having been provided between this member and the other member, the collapsing system consisting at least of a deformation in one of them which abuts against at least one of the longitudinal ribs corresponding to the serration in the other.

Finally, the main patent was improved by a second additional patent P9500177 in that one of said members is coaxial to the steering wheel and is connected thereto while the other member is integral with the main steering shaft and extends it axially.

In the main patent, P9202654, the axial movements of the first member with respect to the second are similarly guided, avoiding, in particular, noise and vibration, by two moulded elements based on a material having a certain degree of elasticity, one of which can optionally be used to establish a system of stops in one direction which will eliminate the possibility of disassembly of the telescopic system. The first of these elements consists of a ring or sleeve which is adjusted and fixed to an inlet orifice provided in the female external member.

The male internal member fits in the interior of this ring or sleeve and can slide with respect thereto The second of said elements consists of a covering of plastics material directly moulded on the end of the internal member (1) or optionally incorporated therein by any other system on which the female external member slides This covering also has longitudinal external knurling extending the knurled region without a solution of continuity and consequently capable of meshing with the knurled region of the female member. Finally, this covering has longitudinal channels intended to allow the free passage of the projections so the effect of velocity relative to the scoring by these projections is exerted exclusively on the longitudinal metallic ribs and not on the moulded ribs extending them.

SUMMARY OF THE INVENTION

The foregoing has been modified in the present improvements in that a throat of small depth is produced in one of the male tubular members and allows the free displacement of the protuberance or projection in a longitudinal direction through it and in that when said protuberance contacts the ends of said throat, an effect of retention and/or plastic deformation with absorption of energy is produced. This effect firstly allows the sleeve or ring to be eliminated and to be substituted by the actual protuberance plus the throat and, secondly, a collapsing effect with absorption of energy and length together with an option of adjustment, both by extension and by compression, is achieved.

To achieve said effects, the external configuration of the lateral surface of the male member is basically modified and is made up as a tubular member having a knurled lateral surface and with a longitudinal sliding region in which there is provided a cleavage point which cooperates with a projecting point provided in the female tubular member, one part of said sliding region which acts as a female catch and ends at a retaining point from which an energy-absorbing collapsing region extends to the end of said male tubular member.

At the opposite end of said collapsing region there extends a further region which is also a collapsing region but by extension which can be of the same length as the collapsing region by compression.

Further details and characteristics of the present patent application will emerge on reading the following description given with reference to the accompanying drawings in which the preferred details are shown schematically. These details are given as examples with reference to a possible embodiment but are not limited to the details given here. This description should be considered as an illustration without limitations of any type.

BRIEF DESCRIPTION OF THE DRAWINGS

The various numbered elements in the drawings accompanying the present specification will be listed hereinafter: female tubular member, 11 male tubular member, 12 fork, 12a lugs, 13 projection, 14 peripheral region, 14a channels, 14b ribs, 15 sliding region, 16 retention point, 17 collapsing region, 18 orifice, 19 ring, 20 female rib, 21 cleavage point, 22 retention point, 23 limit point.

FIG. 4 is a partially sectional plan view from above of the telescopic shaft forming the subject of the present invention.

FIG. 5 is a partial plan view of two embodiments of the improvements to the proposed telescopic shaft.

FIG. 6 is an enlarged partial longitudinal section of the retention points of the proposed telescopic shaft.

DETAILED DESCRIPTION OF THE PREFERRED EMBODIMENTS

Figure 1:
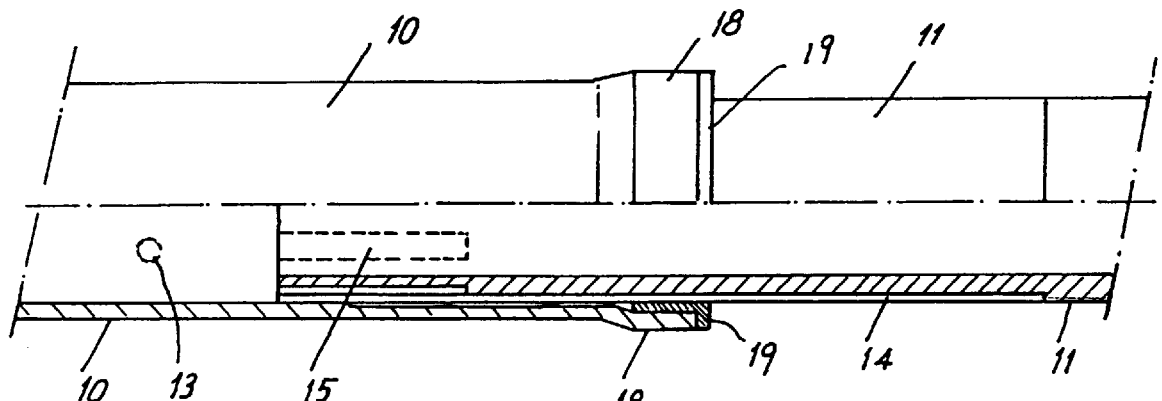
FIG. 1 a diametrical half section of a detail of the telescopic portion of the telescopic shaft forming the subject of the patent P9202654(0)
Figure 2:
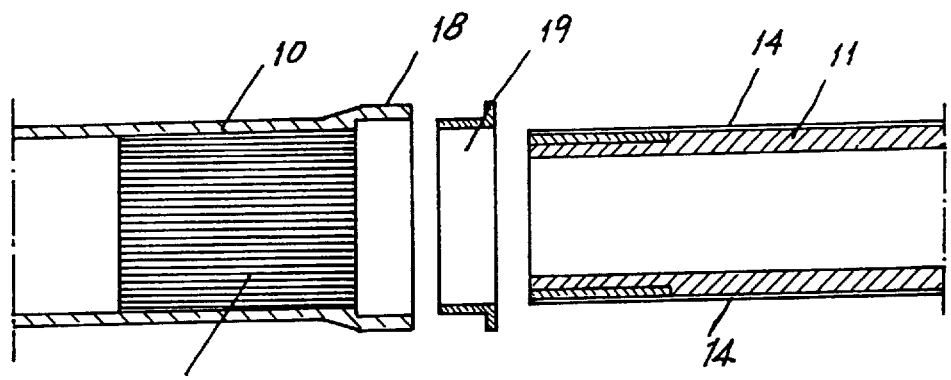
FIG. 2 is a cut away diametrical section of the same ring.
Figure 3:
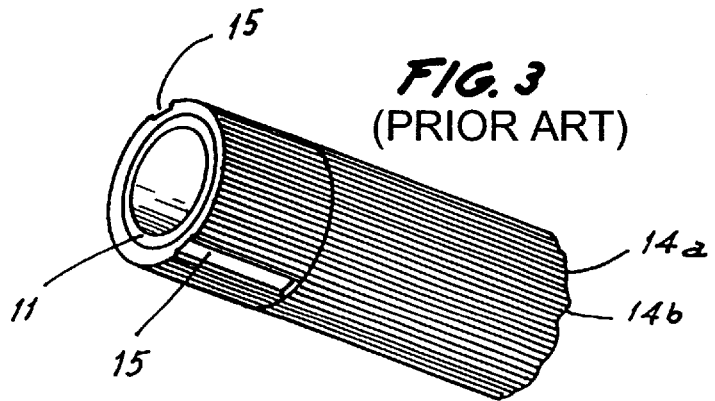
FIG. 3 is a perspective view of the end of the male member of the telescopic system.

FIGS. 1, 2 and 3 show the state of the art created by the patent proprietor on the basis of earlier registrations which show the characteristics of both the female tubular member 10 and the male tubular member 11 and their coupling system As shown in FIG. 3, the male tubular member 11 has a substantially cylindrical configuration in the lateral surface of which there is provided a peripheral region based on channels 14a and ribs 14b whereas, in the vicinity of its end, there is a sliding region 15 arranged in opposing regions of said male tubular member 11.

The particular configuration of said member 11 allows it to be coupled to a female tubular member, see FIG. 2, which, in its internal peripheral region, is formed on the basis of an assembly of channels and ribs of which the dimensions comply with those of the tubular member 11. An orifice 18 or inlet region having a diameter slightly greater than female tubular member 10 being arranged at the end of female tubular member 10 with the aim of allowing a ring or sleeve 19 to be integrated between said orifice 18 of the member 10 and the end region of male tubular member 11.

The provision of a projection 13 in the female member and/or alternatively in the male member in cooperation with the male tubular member 11 means that, in the event of collapse, there is a region for damping when the projection 13 penetrates the gliding region 15, the stroke of 13 continuing through the channels and ribs 14a–14b if there is sufficient force.

In this embodiment, the improvements to the telescopic shaft involve the provision in the peripheral region 14 of the male member 11 of channels 14a and ribs 14b which are interrupted longitudinally by a sliding region 15 which, in one of the embodiments, ends in the vicinity of the fork 12 whereas, in a variation, it can end at the limit of one of the ends of said fork 12, see FIGS. 4. S and 6.

As shown in FIG. 6, a sliding region 15 with two distinct diametrical regions has been provided in the male tubular member 11, the first having a radius $r_1$ while the second has a radius $r_2$, so there are some extreme retention points 16 and 22 in said sliding region.

FIG. 6 is also a partial view of the wall of the female tubular member 10 containing in a known manner the projection 13 which works and is coupled with a cleavage region or point 21 arranged in the sliding region 15.

If, owing to an impact or the like, the operator drops on the steering wheel with his hands or with his body, the system allows a collapse by compression of distance in two phases, a first phase absorbing only movement $d_1$ and a further phase absorbing energy $d_2$ in that the retention point 16 is surpassed by one of the ends of the female tubular member 10 advancing toward the right whereas the male tubular member 11 slides through the interior of female tubular member 10 to the left. The moment when 16 overcomes the distance $r_1$–$r_2$ whereas projection 13 travels outside the cleavage point 21, with the result that there is produced over the distance covered $d_2$ a sum of forces and deformation, firstly that of the end of the female tubular member 10 on the channels and ribs 14a and 14b and that of the projection 13 above the channels 14a and ribs 14b provided in the region of the female catch 20.

Likewise and, if for any reason there were a collapse by extension as we could see in the right-hand part of FIG. 6, the proposed arrangement would allow the projection 13 to travel to the left and enter peripheral 14, deforming the channels and ribs 14a and 14b until reaching the retention point 22.

In other words, a sliding (collapsing) region $d_1$ and a region for collapse by compression $d_2$ are created between the limit point 23 and the retention point 22.

Alternatively, and as shown in FIG. 5, the sliding region 15 could end at the limit of the region where the fork originates so the region for collapse by absorption of energy in collapsing region 17 can be dispensed with The content of the present patent has been described sufficiently with reference to the accompanying drawings and it will be appreciated that any suitable modifications to details can be introduced therein providing that the essence of the patent summarized in the following claims is not affected.

I claim:

1. A telescopic shaft comprising:

a female tubular member having an end region with a fork and an opposite end having an orifice receiving an end region of a male tubular member with an opposite end of the male tubular member having a fork, peripheral regions of the female tubular member and the male tubular member having channels and ribs for sliding of the male tubular member with respect to the female tubular member and vice versa, a projection provided in the opposite end of the female tubular member, said projection sliding, in the event of collapse of the male tubular member and the female tubular member, through a region of the end region of the male tubular member, the peripheral region of the male tubular member including a throat which longitudinally interrupts the channels and ribs of the male tubular member, wherein the throat is formed by a peripheral sliding region of radius $r_1$ and a further sliding region of radius $r_2$ with the radius $r_1$ being greater than the radius $r_2$ and the projection initially sliding in the further sliding region of radius $r_2$ and upon continued application of force sliding in the peripheral sliding region of radius $r_1$ having increased resistance to the applied force.

2. A telescopic shaft according to claim 1, wherein the sliding region has two retention points at opposite ends whereas the sliding region of radius $r_2$ has a cleavage point corresponding to the projection.

3. A telescopic shaft according to claim 2, wherein one of the retention points is located adjacent to the fork of the male tubular member.

4. A telescopic shaft according to claim 2, wherein the female tubular member will slide in the event of collapse of the female tubular member and the male tubular member, with the opposite end of the female tubular member surpassing one of the retention sliding through points and subsequently through a remaining length of the sliding region.

* * * * *